United States Patent [19]
Tabat et al.

[11] Patent Number: 5,808,384
[45] Date of Patent: Sep. 15, 1998

[54] SINGLE COIL BISTABLE, BIDIRECTIONAL MICROMECHANICAL ACTUATOR

[75] Inventors: Ned Tabat; Henry Guckel, both of Madison, Wis.

[73] Assignee: Wisconsin Alumni Research Foundation, Madison, Wis.

[21] Appl. No.: 869,789

[22] Filed: Jun. 5, 1997

[51] Int. Cl.⁶ .......................... H02K 15/00; H02K 57/00
[52] U.S. Cl. ............... 310/40 MM; 310/42; 310/DIG. 6
[58] Field of Search .............................. 310/40 MM, 42, 310/28, 29, 30, 12, 17, DIG. 6; 335/234, 239, 253

[56] References Cited

U.S. PATENT DOCUMENTS

| | | | |
|---|---|---|---|
| 5,189,777 | 3/1993 | Guckel et al. | 29/424 |
| 5,190,637 | 3/1993 | Guckel | 205/118 |
| 5,206,983 | 5/1993 | Guckel et al. | 29/598 |
| 5,327,033 | 7/1994 | Guckel et al. | 310/42 X |
| 5,378,583 | 1/1995 | Guckel et al. | 430/325 |
| 5,470,043 | 11/1995 | Marts et al. | 335/234 X |
| 5,644,177 | 7/1997 | Guckel et al. | 310/42 X |

OTHER PUBLICATIONS

H. Guckel, et al., "Electromagnetic, Spring Constrained Linear Actuator with Large Throw," Actuator 94, 15–17 Jun., Bremen, Germany.
T.R. Ohnstein, et al., "Tunable IR Filters Using Flexible Metallic Microstructures," Proceedings of IEEE Micro Electro Mechanical Systems (MEMS) 1995, Amsterdam, Holland, Jan. 29–Feb. 2, 1995, pp. 170–174.
T.R. Christenson, et al., "An Electromagnetic Micro Dynamometer," Proceedings of IEEE Micro Electro Mechanical Systems (MEMS) 1995, Amsterdam, Holland, Jan. 29–Feb. 2, 1995, pp. 386–391.
H. Guckel, et al., "Electromagnetic Linear Actuators with Inductive Position Sensing," Sensors and Actuators A 53, 1996, pp. 386–391 (Month Unknown).
B. Rogge, et al., "Magnetic Microactuators Fabricated by the LIGA—Technique for the Large Displacements or Large Forces," Actuator 96, 5th International Conference on New Actuators, 26–28 Jun. 1996, Bremen, Germany, pp. 112–115.
T. Earles, et al., "Magnetic Microactuators for Relay Applications," Actuator 96, 5th International Conference on New Actuators, 26–28 Jun. 1996, Bremen, Germany, pp. 132–135.
H. Guckel, "Progress in Electromagnetic Microactuators," Actuator 96, 5th International Conference on New Actuators, 26–28 Jun. 1996, Bremen, Germany, pp. 45–48.

Primary Examiner—Steven L. Stephan
Assistant Examiner—Judson H. Jones
Attorney, Agent, or Firm—Foley & Lardner

[57] ABSTRACT

Micromechanical actuators capable of bidirectional and bistable operation can be formed on substrates using lithographic processing techniques. Bistable operation of the microactuator is obtained using a single coil and a magnetic core with a gap. A plunger having two magnetic heads is supported for back and forth linear movement with respect to the gap in the magnetic core, and is spring biased to a neutral position in which the two heads are on each side of the gap in the core. The single electrical coil is coupled to the core and is provided with electrical current to attract one of the heads toward the core by reluctance action to drive the plunger to a limit of travel in one direction. The current is then cut off and the plunger returns by spring action toward the gap, whereafter the current is reapplied to the coil to attract the other head of the plunger by reluctance action to drive the plunger to its other limit of travel. This process can be repeated at a time when switching of the actuator is required.

25 Claims, 11 Drawing Sheets

SINGLE COIL BISTABLE, BIDIRECTIONAL MICROMECHANICAL ACTUATOR

FIELD OF THE INVENTION

This invention pertains generally to the field of micromechanical devices and processing techniques therefor, and particularly to micromechanical actuators.

BACKGROUND OF THE INVENTION

Deep X-ray lithography may be combined with electroplating to form high aspect ratio micromechanical structures. In what is often referred to as the LIGA process, exposure of the photoresist with X-rays passed through a suitable mask and development are followed by electroplating, resulting, after cleanup, in fully attached metal structures with very high aspect ratios. A general review of the LIGA process is given in the article by W. Ehrfeld, et al., "LIGA Process: Sensor Construction Techniques Via X-Ray Lithography" Technical Digest IEEE Solid-State Sensor and Actuator Workshop, 1988, pp. 1–4. The addition of a sacrificial layer to the LIGA process facilitates the fabrication of fully attached, partially attached, or completely free metal structures. See H. Guckel, et al., "Fabrication of Assembled Micromechanical Components via Deep X-Ray Lithography," Proceedings of IEEE Micro Electro Mechanical Systems, Jan. 30–Feb. 2, 1991, pp. 74–79; and U.S. Pat. No. 5,189,777 to Guckel, et al.

Further extensions of the LIGA process have included the formation of magnetically driven micromechanical rotating motors, as shown in U.S. Pat. Nos. 5,206,983 and 5,327,033 to Guckel, et al. Complex multiple layer microstructures can be formed of metal, which can include sacrificial metal layers which are etched away by an etchant which does not affect the primary metal, as shown in U.S. Pat. No. 5,190,637 to Guckel. Significant improvements in the formation of microstructures, particularly those with very high aspect ratios, is obtained utilizing a preformed photoresist sheet, as described in U.S. Pat. No. 5,378,583 to Guckel, et al.

Using this technology, it has been possible to develop very small electromechanical actuators. See T. Earles, P. Mangat, J. Klein and H. Guckel, "Magnetic Microactuators for Relay Applications," Proc. of Actuator 96, 5th International Conference on New Actuators, 26–28 Jun. 1996, Bremen, Germany, pp. 132–135, and U.S. patent application Ser. No. 08/393,432 by Guckel, et al., filed Feb. 23, 1995, entitled "Micromechanical Magnetically Actuated Devices." Such micromachined actuators are particularly suited for switches in which a stream of electronic, optical, or molecular flux is to be mechanically directed from a pole channel to either of two throw channels. Such a switch is inherently symmetric: the two throw channels are physically identical and differ only in their terminal destinations. When the switch is actuated, the stream is redirected from one throw channel to the other, and back again when the switch is actuated in the other direction. Although the switch actuator can be returned by a spring to its opposite stationary or latched position, when current to the coil of the actuator is cut off, it is often desirable that the switching transitions be as quick as possible and that the terminal forces holding the actuator in its latched positions be as large as possible. Since it is difficult to design variable reluctance actuators with reversible force directions, dual latching actuators have been realized in the past by employing two independent flux paths and two solenoid coils placed at the two extremes of the actuation axis, as described in the foregoing paper by Earles, et al. The two solenoids are selectively energized one at a time depending on the desired direction of actuation. Such a design imposes two significant limitations on the overall switch performance, namely size, since the flux paths must be placed some distance away from the spring/plunger assembly center position, and cost, as the solenoid coils are likely to be the actuator component most expensive to fabricate and assemble.

SUMMARY OF THE INVENTION

In accordance with the present invention, micromechanical actuators capable of bidirectional and bistable operation can be utilized for various high precision actuation purposes, including electrical switches and relays, optical switches such as fiber optic switches, and fluid control valves and pumps. The microactuator structures can be formed in a compact, substantially planar arrangement on a substrate utilizing lithographic processing in a manner which is compatible with the formation of electronic devices on the substrate (which may comprise, for example, single crystal silicon). In the present invention, bistable operation of the microactuator is obtained utilizing a single coil and a single magnetic core to minimize the overall size of the actuator structure and allow a significant reduction in cost over actuators requiring two or more coils. In the present invention, the linear actuator is driven between its two limits of travel magnetically by the action of the single coil, thereby achieving faster switching times than can be obtained with prior single coil actuators which are dependent only on spring return for switching in one of the directions of travel. The actuator structures of the invention can readily be produced with high precision and very tight tolerances utilizing X-ray lithography techniques, with, if desired, vertical dimensions of 2 mm and less.

The bidirectional actuators of the present invention can be formed on a nonmagnetic substrate, which provides a support for the components of the actuator. A magnetic core is supported on the substrate and has end faces spaced apart to define a gap in the core. The plunger is formed to have two magnetic heads which are spaced from each other and joined to move together, with at least the heads of the plunger formed of a magnetic material. The plunger is supported for linear back and forth movement in two co-linear directions such that the heads of the plunger can each move toward and away from the gap in the core. The plunger is biased to a neutral position in which the two heads of the plunger are on opposite sides of the gap in the core. A coil of electrical conductor is coupled to the magnetic core to establish, when the coil is supplied with electrical current, magnetic flux therethrough and across the gap so that each head of the plunger is magnetically drawn toward the gap when the coil is supplied with current. Stop structures are positioned to engage a portion of the plunger at a selected limit of travel of the plunger in each direction of movement of the plunger.

When the coil is not supplied with current, the plunger is located at its neutral position with the two heads of the plunger on opposite sides of the gap. When the coil is then supplied with current, the magnetic flux from the core will pass through the two heads of the plunger to form a complete magnetic circuit. Each head will be drawn toward the gap by reluctance minimization forces so that the forces imposed by the magnetic field on the two heads are directly counter to one another. Because the magnetic forces on the heads are substantially reduced as they are withdrawn from the gap, even a slight asymmetry between the two heads and the core will result in a force applied to one of the heads that is greater than that applied to the other, accelerating the plunger in one direction of travel. The difference in forces applied to the heads rapidly increase as the plunger begins to move and one of the heads draws closer to the core while the other head moves away from the core. Consequently, when the coil is initially supplied with current, the plunger rapidly accelerates in one direction of motion. The motion of the plunger is stopped by stop structures positioned to engage a portion of the plunger at a selected limit of travel, which may be at a position before any contact of the head with the faces of the core. The plunger will remain at this limit position as long as current is supplied to the coil. When the supply of current to the coil ceases, the plunger is urged back toward its neutral position, for example, by the action of a spring. If current is now resupplied to the coil at a time when the plunger is near its neutral position, the other head of the plunger will be preferentially drawn to the core, driving the plunger to its opposite limit of travel where it is stopped by stop structures which engage a portion of the plunger at the limit. When the device is to be switched in the opposite direction, the process may now be repeated by cutting off the current to the coil, allowing the plunger to return back toward its neutral position, and then reapplying current to the coil.

In this manner, the plunger may be rapidly switched back and forth between its limits of travel by alternately switching current on and off to the coil. The bidirectional switching action of the plunger is faster than could be obtained with a similar plunger structure with a single coil with the plunger returned to a second stationary position by, for example, a spring alone. In the present invention, when the current to the coil is cut off, the spring biasing of the plunger toward the neutral position provides initial acceleration away from the limit of travel toward the neutral position, but the driving of the plunger to its opposite limit of travel is completed by supplying current to the coil to apply the much stronger magnetic driving force to the plunger.

The supporting of the plunger for linear movement may be accomplished utilizing a spring, integrally formed with the plunger, which has mounting sections mounted to the substrate and additional spring sections which extend to the plunger. The plunger and spring assembly is preferably elevated from the substrate by the use of shims underneath the mounting sections. Mounting the plunger in this manner minimizes any frictional damping forces on the motion of the plunger since it is out of contact with any other surfaces, and allows very linear spring forces to be applied to the plunger. The magnetic core may be formed on the substrate utilizing X-ray lithography techniques, with electrodeposition of metal on the substrate, and the mounting structures for the spring and the stop structures can similarly be formed on the substrate by such techniques, which are readily suited to large scale manufacturing and to obtaining extremely high precision microstructures having dimensional tolerances less than 1 micron. An integrally formed spring and plunger can also be formed by X-ray lithography and metal electrodeposition techniques on a sacrificial layer, allowing the plunger to be removed after forming and assembled onto the mounting structures on the substrate. Similarly, the coil may be wound on a mandrel that is also formed by lithography techniques, and the coil and mandrel can readily be assembled to the fixed core on the substrate to complete the actuator structure.

The present invention has the particular advantage of requiring only a single coil per bidirectional actuator, rather than the two or more coils that have been conventionally required for bidirectional, bistable reluctance actuators. Because the present invention utilizes reluctance effects to drive the plunger between its limits of travel, a permanent magnet is not required, and conventional magnetic materials such as ferromagnetic metals may be utilized, which can readily be formed by X-ray lithography and electrodeposition techniques in the small dimensions and high precision required for practical microstructures.

Further objects, features and advantages of the invention will be apparent from the following detailed description when taken in conjunction with the accompanying drawings.

DETAILED DESCRIPTION OF THE INVENTION

Figure 1:
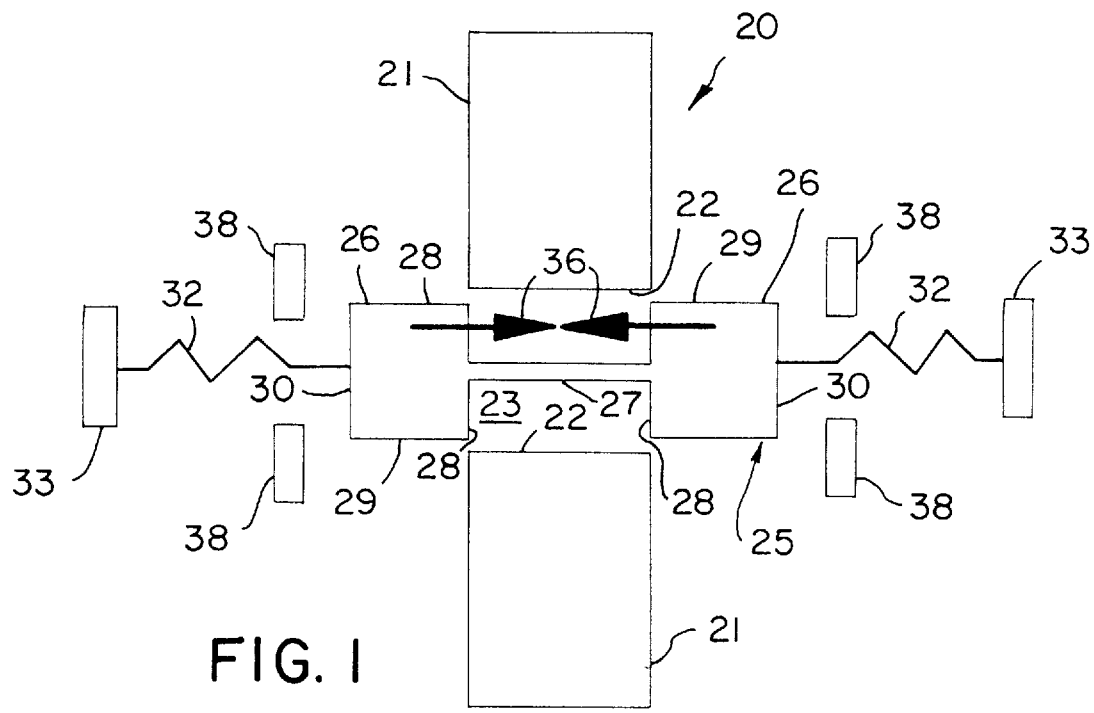
FIG. 1 is a schematic view illustrating the action of the actuator in accordance with the present invention with the plunger located at its neutral position.
Figure 2:
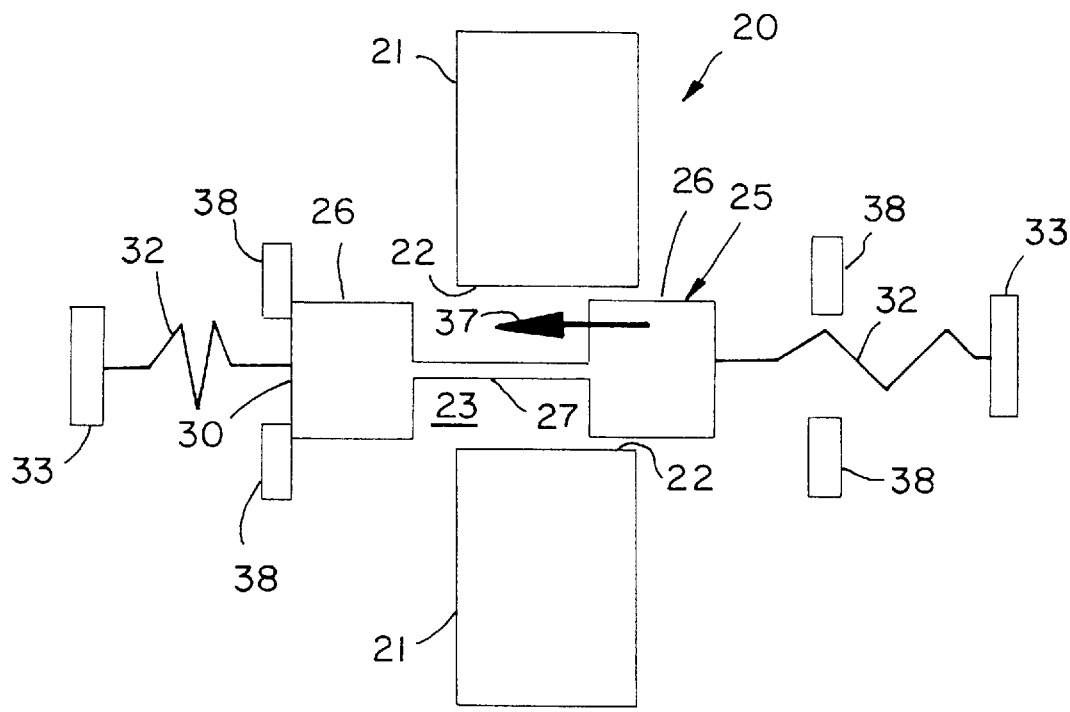
FIG. 2 is a schematic view of the actuator as in FIG. 1 showing the plunger moved to one of its limits of travel.

To illustrate the principles of the present invention, a bidirectional, bistable actuator in accordance with the invention is shown in simplified form at 20 in FIG. 1 in its neutral or unenergized position, and in FIG. 2 at one of its limit positions. The actuator 20 has fixed magnetic core sections 21 with end faces 22 that face each other across a gap 23. Magnetic flux is provided to the magnetic core sections 21 by a coil (not shown) which, when energized, provides magnetic flux between the core pieces 21 across the gap 23. A plunger 25 is mounted adjacent to the core sections 21 so that it can move within the gap 23. The plunger 25 has two plunger heads 26 which are spaced from one another and joined together by a plunger body section 27. The heads 26 have inner faces 28, side faces 29, and back faces 30, although, as is explained further below, the plunger heads 26 may have configurations more complex than the square configurations shown in FIGS. 1 and 2. The plunger 25 is mounted for back and forth linear movement and is biased initially to its neutral position shown in FIG. 1 by, for example, restoring springs 32 that are connected to each side of the plunger and to mounting structures 33; thus, when no other forces are applied to the plungers, the springs 32 apply forces to the plunger to move the plunger to the neutral position of FIG. 1. In this position, both of the plunger heads 26 are out of or only partially inserted into the gap 23 and are essentially symmetrically positioned with respect to the gap 23 and the end faces 22 of the core.

When flux is applied to the core sections 21 to extend across the gap 23, the flux will tend to be directed through the heads 26 of the plunger, which are formed of a magnetic material. In accordance with well known magnetic principles, forces will be applied to the heads 26 of the plunger that are directed inwardly toward the gap 23 (as illustrated by the arrows 36 in FIG. 1), which tend to move the heads to minimize the reluctance of the magnetic circuit. The forces illustrated by the arrows 36 on the two spaced heads 26 will be approximately equal if the plunger heads 26 are essentially identical in size and shape and are initially spaced exactly the same distance from the gap 23 in the core. However, as a practical matter, there will be slight asymmetries between the positions or the sizes of the heads 26 of a practical plunger, resulting in a somewhat greater force being applied to one of the heads than the other. As a consequence, the plunger will be accelerated in one direction due to the greater force in that direction, as illustrated by the arrow 37 in FIG. 2. As the head 26 that has the greater initial force applied to it moves closer to and into the gap 23, the force on that head increases whereas the magnetic force applied to the other head 26, which is moving away from the gap, decreases. The result is a rapidly increasing acceleration of the plunger in one direction, with the movement of the plunger in that direction being stopped by the engagement of, for example, the back surface 30 of the one head with surfaces of stop structures 38 that are positioned to engage the plunger at a selected limit of travel in the first direction. As illustrated in FIG. 2, the spring 32 attached to the plunger head 26 which is at its stop limit is compressed, whereas the spring 32 which is attached to the head which is in the gap 23 is stretched. Consequently, when the magnetic flux is removed from the gap 23, the springs 32 will exert a force on the plunger to draw the plunger back toward the neutral position, accelerating the plunger to a maximum velocity that would be reached when the plunger reaches the neutral position of FIG. 1. The momentum of the plunger will carry the plunger somewhat past the neutral position. If the flux is now reapplied to the core sections 21 at the time, for example, when the plunger has passed the neutral position, the opposite head 26 will now be preferentially inserted into the gap 23 and will experience the greater magnetic force, resulting in the plunger 25 being driven to the right hand side stops 38 shown in FIG. 2 and being retained at those stops for as long as flux is applied to the core sections 21 and across the gap 23. When the flux is cut off, the springs will again act to return the plunger toward its neutral position, and reapplying the flux at the time, for example, when the plunger has passed its neutral position will result in a rapid switching of the plunger over to the left side stops as shown in FIG. 2. In this manner, the plunger can be moved rapidly back and forth between its two limits of travel. It may be noted that, because of the momentum of the plunger being returned to the neutral position under the action of the springs, the flux may be applied to the cores 21 at a point in time when the plunger is just at its neutral position, and in some cases even before the plunger reaches the neutral position.

The highly non-linear and bistable characteristics of the actuator 20 are apparent from the fact that, in variable reluctance linear actuators, the attractive force F(x) exerted on the plunger heads 26 has the following general dependence on the position x of the head along the actuation axis away from the gap:

$$F(x) \cong \frac{F_o}{(1 + \lambda x)^2}$$

where $F_0$ is the force strength at the origin and $\lambda$ is a constant which depends on the device geometry and permeabilities. For actuator designs in which the core faces 22 are parallel to the actuation axis (gap insertion devices), the arrangement shown in FIGS. 1 and 2, the constant in the denominator tends to dominate (i.e., the magnetic force changes relatively slowly with position), while for actuator designs for which the core faces 22 are perpendicular to the actuation axis (gap closure or $1/d^2$ devices), the position dependent term "$\lambda x$" in the denominator dominates. With respect to gap insertion devices, the foregoing equation is generally valid only when the plunger head 26 is in the gap 23, and the force F on the head drops rapidly to zero as the plunger head moves out of the gap.

Figure 3:
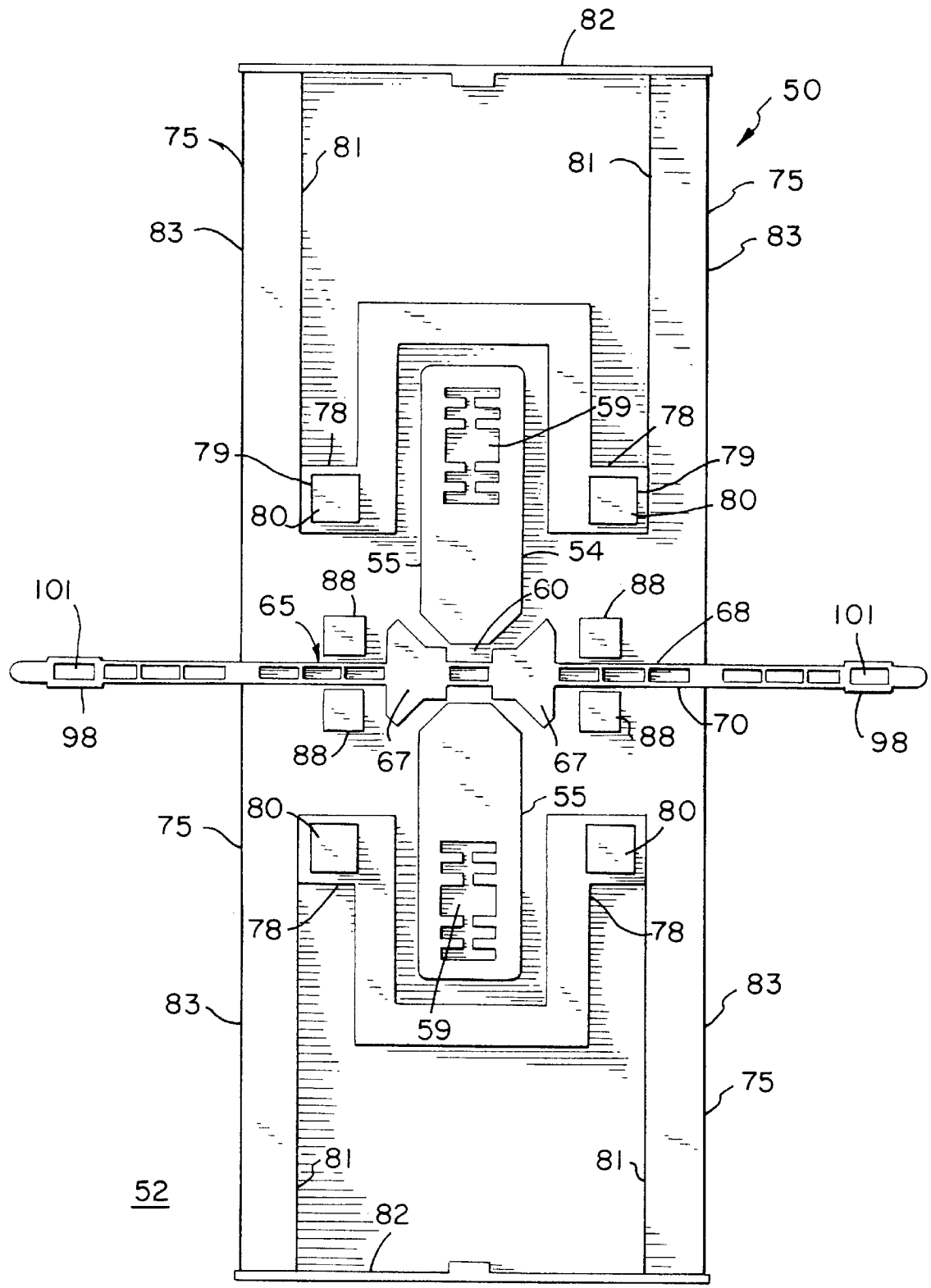
FIG. 3 is a plan view showing the magnetic core and spring mounted plunger of an actuator in accordance with the present invention formed as a microstructure on a substrate.
Figure 4:
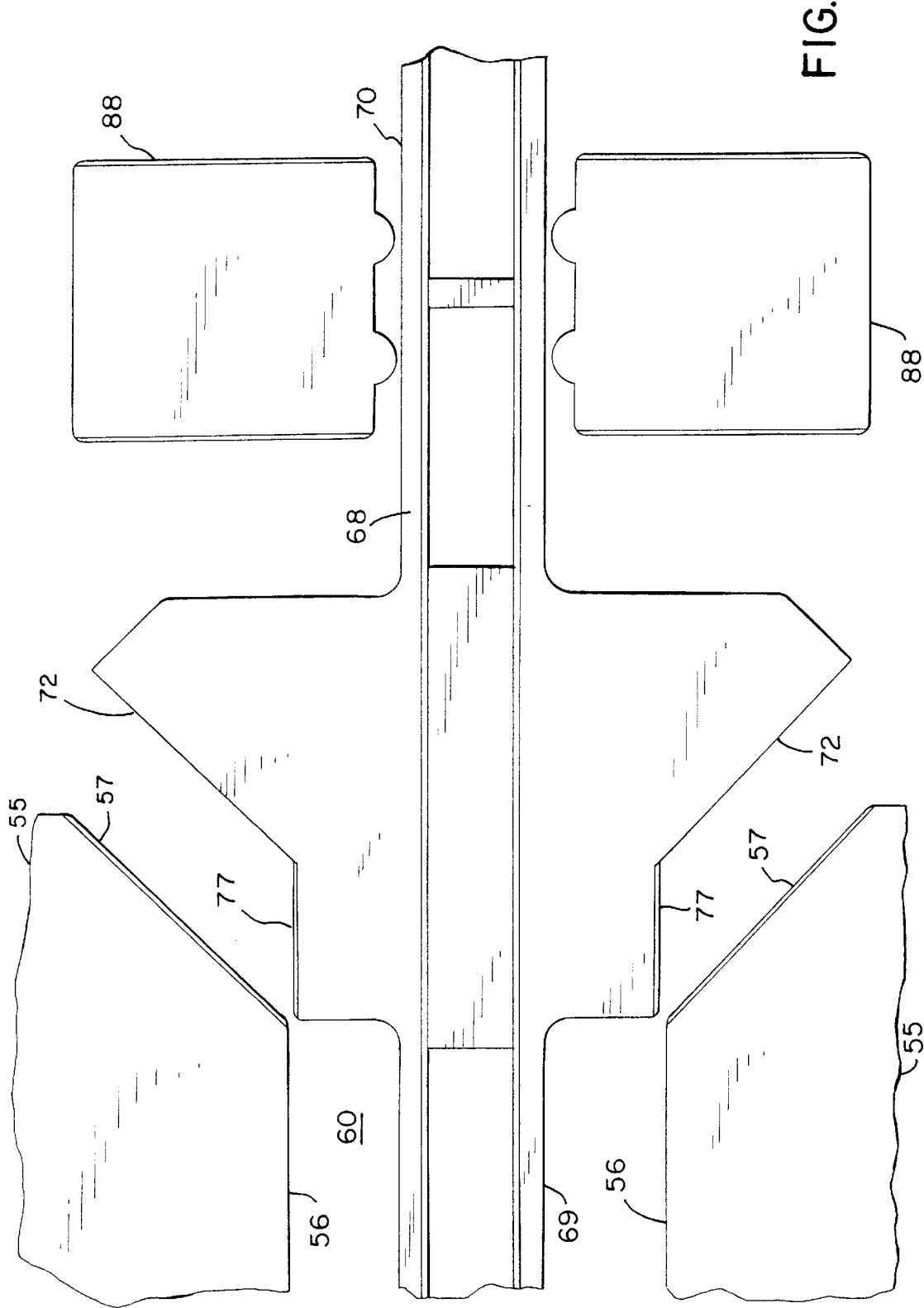
FIG. 4 is an expanded and simplified view of a portion of the structure of FIG. 3, better illustrating the adjacent surfaces of the fixed core and movable plunger of the actuator.

A plan view of a portion of a micromechanical embodiment of a linear actuator 50 in accordance with the present invention is shown in FIG. 3. Metal structural components of the actuator 50 are formed on a substrate 51, which generally will have a planar top surface 52. The substrate 51 can be formed of a variety of materials, including metals, plastics, ceramics, glasses, and semiconductors. An advantage of the present invention is that the substrate 51 may be a semiconductor, such as single crystal silicon, and the formation of the micromechanical structures on the substrate 51 is compatible with conventional photolithographic processing of semiconductors. Structures of the actuator 50 shown in FIG. 3 include a fixed magnetic core 54 which has two separate core sections 55 formed, for example, as described further below, on the surface 52 of the substrate 51. The core sections 55 are preferably formed generally in a planar fashion as prismatic-type structures on the planar surface 52 of the substrate. As best shown in FIG. 4, the core sections 55 have end faces which include opposed face surfaces 56 which are parallel to each other and to the actuation axis and oblique surfaces 57 which extend at an angle (e.g., 45°) to the end face surfaces 56 and the actuation axis. The core sections 55 have an opening or a series of openings defining a receptacle 59 in the top of the core sections which allow coupling to a coil structure, as described below. The fixed core sections 55 are formed of a magnetic material, particularly a ferromagnetic metal such as nickel, iron, or nickel-iron alloys.

The end face surfaces 56 and 57 of the magnetic core sections 55 define, between the opposed faces of each of the core sections 55, a gap 60. When magnetic flux is provided to the core sections 55, the flux will pass through the gap 60. A plunger 65 is mounted with its two heads 67 positioned adjacent to the gap 60 between the core sections 55. The plunger 65 has an elongated plunger body 68 which includes a central section 69 which joins the two heads 67 structurally and maintains the spacing between the heads, and laterally extending end sections 70 which extend from the back of the heads 67. As best shown in FIG. 4, each of the plunger heads 67 is formed to have surfaces 71 which are parallel to the inner face surfaces 56 of the core, and parallel to the direction of linear back and forth travel of the plunger (the actuation axis), and oblique surfaces 72 which are parallel to the oblique surfaces 67 on the plunger and at an angle to the linear direction of travel of the plunger. Consequently, when magnetic flux is provided to the core sections 55 to pass across the gap 60, the flux circuit will be primarily formed through the heads 67. The shaping of the heads 67 so that the oblique surfaces 72 are parallel to the oblique surfaces 67 of the core sections, and so that the inwardly extending surfaces 71 of each head are parallel to the inner face surfaces 56 of the core sections, helps to minimize the air gap and maximize the magnetic reluctance forces applied to the heads 67 as each approaches the gap 60.

The plunger 65, or at least the heads 67 thereof, are formed of magnetic material, for example, ferromagnetic metal. The plunger 65 is preferably supported for linear movement by springs 75 which preferably provide a highly linear spring force. The springs 75 illustrated in FIG. 3 are rectangular-type springs having a mounting section 78 on each side of the core sections 55, with openings 79 therein by which the springs are mounted to posts 80 which extend upwardly from the surface 52 of the substrate. The springs 75 further include outwardly extending sections 81 that extend from the mounting section 78 to an end section 82, and inwardly extending sections 83 that extend from the lateral end sections 82 to join with the plunger body 68. The spring sections 81, 82 and 83 are free of the substrate 51 and thus can move freely as the plunger 65 moves.

Figure 5:
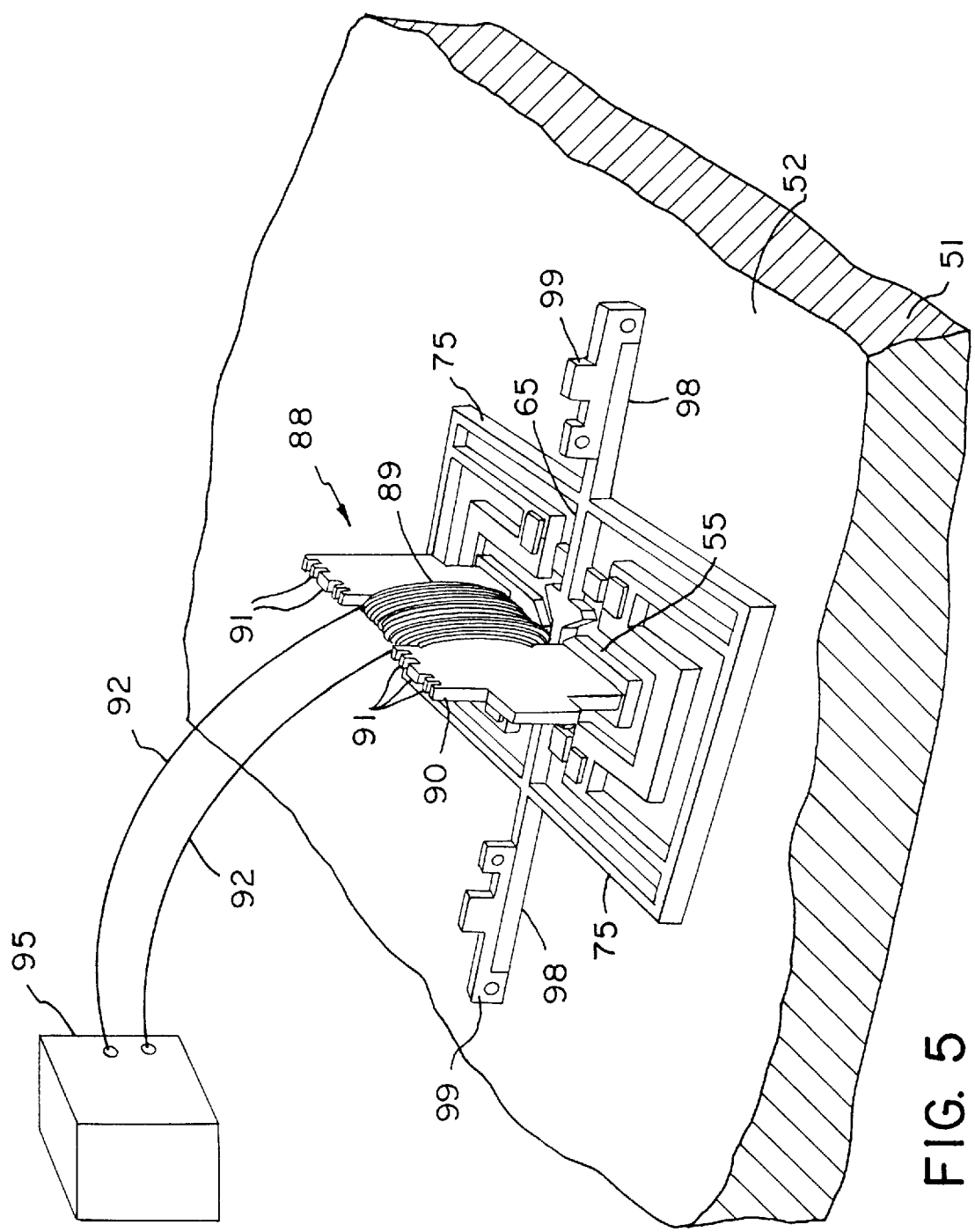
FIG. 5 is a perspective view of an assembled microstructure actuator in accordance with the invention.

As illustrated in FIG. 5, the actuator 50 is completed by the addition of an electrical coil section 88 which includes a solenoidal coil of electrical conductor 89 wound on a mandrel 90 which has mounting pegs 91 (the pegs 91 at the top edge of the mandrel 90 are shown in FIG. 5) that are inserted into the receptacles 59 in the core sections 55. When the coil 89 is supplied with current on its leads 92 from a power supply 95, the magnetic flux from the coil will pass in a circuit through the mandrel 90, through one of the core sections 55, across the gap 60 to the other core section 55, and thence back to the mandrel (which is also preferably formed of a magnetic material such as a ferromagnetic metal). Consequently, when the electrical contact leads 92 are connected to an electrical circuit with the power source 95, one or the other of the heads 67 of the plunger will be drawn into the gap. As discussed above, the direction in which the plunger will be preferentially drawn into the gap will depend on any asymmetries between the plunger head, core sections, positioning of the various parts, etc. The actuator 50 can then be operated as discussed above to function as a relay, a switching device for fiber optic circuits, etc.

The multifaceted plunger and core of the actuator 50 of FIGS. 3, 4 and 5 features translation axis (x-axis) parallel face surfaces 56 on the core sections and 77 on the heads 67 for achieving strong bistability and large initial acceleration, and oblique surfaces (e.g., 45° angled) 57 on the core and 72 on the heads for obtaining large, $1/d^2$ type closure forces at the limits of the plunger travel.

The micromechanical actuator structure 50 may be fabricated by a LIGA-like process as described in U.S. patent application Ser. No. 08/393,432, which is incorporated herein by reference. Other machining techniques, such as micromachining with an excimer laser, may also be used if desired.

Figure 6:
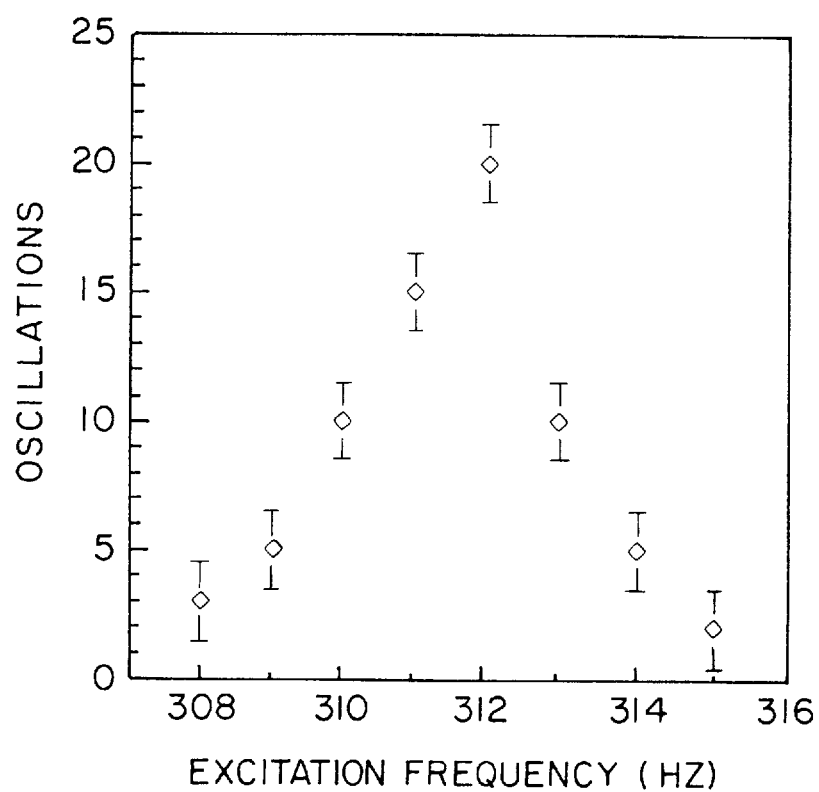
FIG. 6 is a plot of oscillation resonance versus the frequency of the electrical excitation current provided to the coil of a microactuator as shown in FIG. 5.

To illustrate the invention, an exemplary micromechanical actuator as shown in FIGS. 3, 4 and 5 was formed with 10 $\mu$m wide folded springs having 1825 $\mu$m long inner beam 81 lengths and 2750 $\mu$m long outer beam 75 lengths. The 100 $\mu$m tall plunger-spring assembly is elevated from the substrate by shims (not shown) placed around the mounting posts 80, eliminating all sliding friction. The separation between the plunger head faces 77 and the flux path x-axis parallel core surfaces 56 is 5 $\mu$m. The limits of the plunger travel are 110 $\mu$m on either side of the neutral position, for a total actuator throw of 220 $\mu$m. The travel limits are set by hard stop bumper structures 88 that maintain a final separation distance of 3.5 $\mu$m between the oblique plunger head face surfaces 72 and the oblique core face surfaces 57. Two collinear pushrods 98 extend beyond the plunger 65 and along both actuation directions. As shown in FIG. 5, fiber optic harnesses 99 may be mounted and riveted at the ends of the pushrods 98 for securing a load, such as an electrical or a fiber optic switch to the actuator. The magnetomotive force is supplied by an externally wound and assembled 300 turn solenoid coil 89 having an open-loop low-frequency inductance of 1 mH and a resistance of 45$\Omega$. A low-amplitude near-resonance excitation curve of the plunger of this actuator is shown in FIG. 6, indicating a natural frequency of 311 Hz and a resonator Q in excess of 100. The device was successfully operated as a bidirectional dual-latching actuator, requiring an excitation current as small as 20 mA into the solenoid coil 89 to maintain latching at frequencies higher than 600 switches per second.

Figure 7:
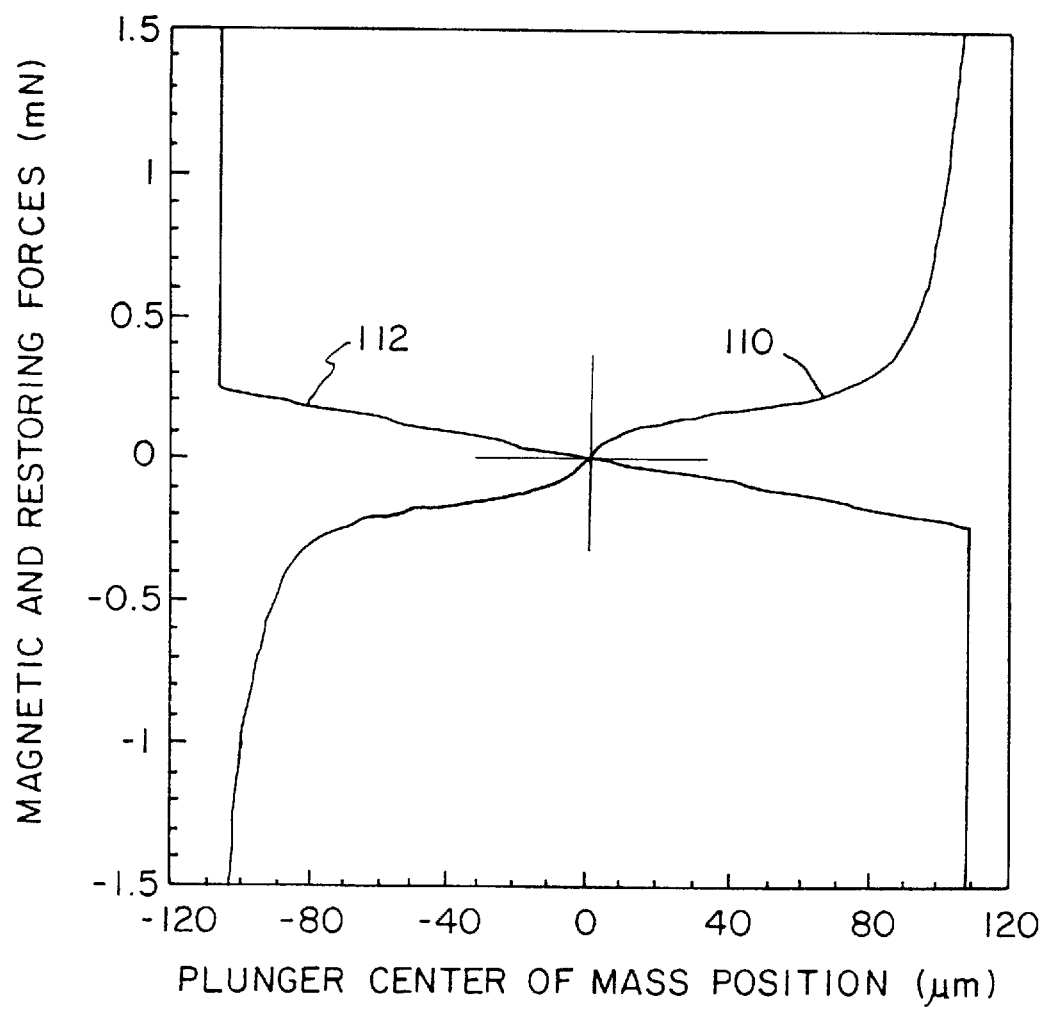
FIG. 7 are graphs of the magnetic and restoring forces as a function of plunger center of mass position for an exemplary microactuator in accordance with the invention.
Figure 8:
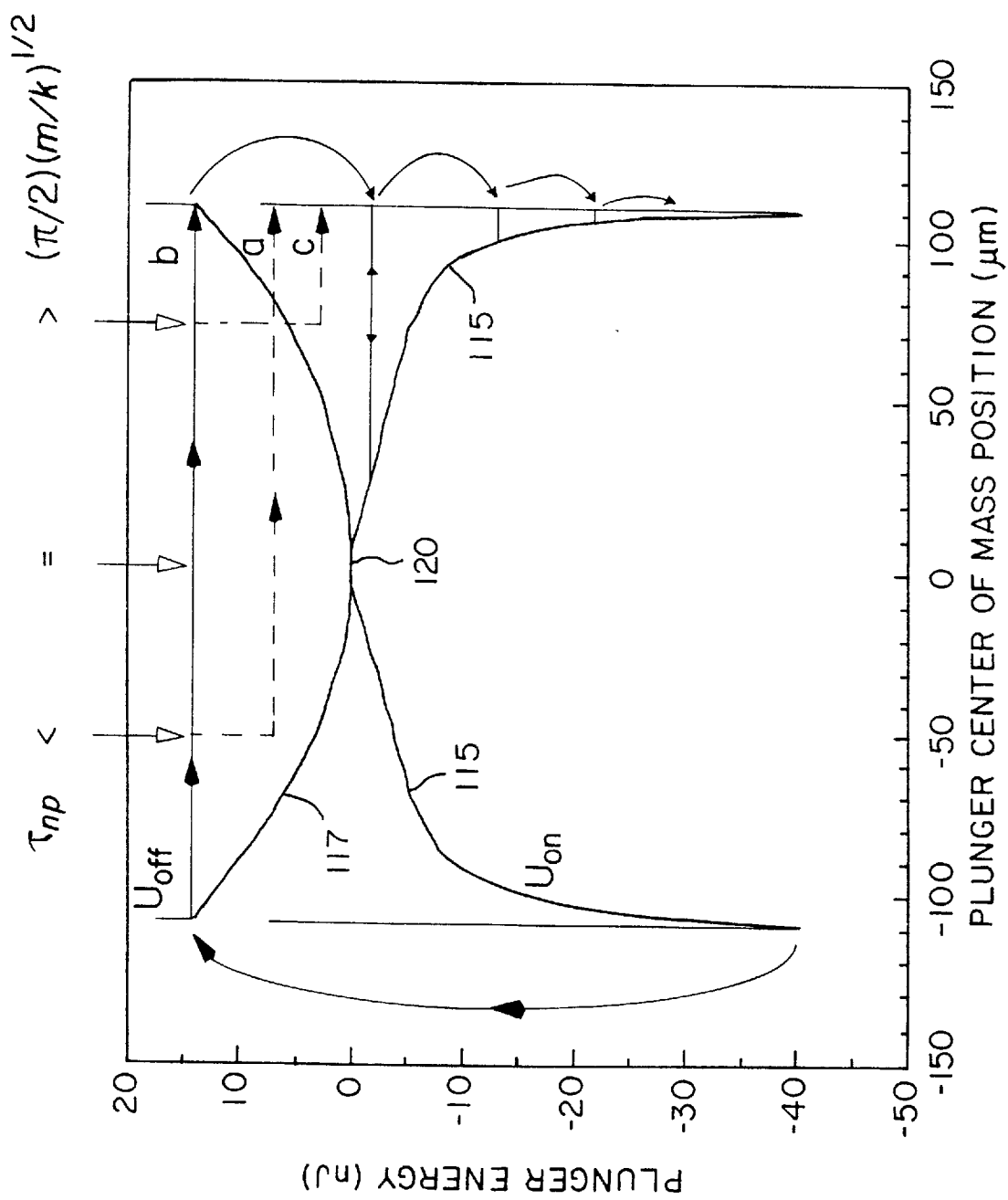
FIG. 8 are graphs of plunger energy versus plunger center of mass position for an exemplary microactuator in accordance with the present invention.

The force profile of the plunger of the actuator can be calculated using commercially available software (e.g., OERSTED® Eddy Current Solver V2.4 1996, Integrated Engineering Software, Inc.). The results of these calculations are shown at 110 in FIG. 7 for a magnetomotive force of 6 AT and a material B-H curve representative of the electroplated 78:22 permalloy used in the fabrication of the plunger, the core sections and the mandrel. Approximating the motion of the actuator by a single degree of freedom, the force constant of the folded springs can be calculated from beam deflection theory to be k=2.2N/m. The corresponding restoring force profile 112 is also plotted in FIG. 7. The spring force constant along with the measured resonance frequency yield an effective mass of m=5.8×10$^{-7}$ Kg for the plunger. The electroplated permalloy is quite hard and the material stress-strain relationship remains linear during the collision between the plunger and the bumpers 88. The collision kinetics can therefore be modelled using a damped linear spring with a force constant given by: $\kappa$=AE/L, where A is the collision contact area, E is the Young's modulus, and L is the length scale of the compressive strain. The resulting estimate for the collision force constant is approximately 2×10$^7$N/m. The combined magnetic force and the restoring forces of the spring and the bumper collisions can be represented by the gradient of the plunger potential energy as shown at 115 in FIG. 8. The corresponding de-energized energy diagram derived without the magnetic force is also plotted at 117 in the same figure. These energy diagrams are useful in visualizing the device kinetics during the switching process. When the solenoid coil 89 is de-energized, the plunger is monostable at its neutral position 120. When the device is sufficiently energized, the plunger becomes bistable at the two travel limits represented by the corresponding potential wells, and metastable at its neutral position. The switching process involves the ejection of the plunger from one potential well and its capture by the opposite well. The plunger total energy trajectories projected in FIG. 8 begin with the plunger latched and at rest at the left travel limit. Once the solenoid is de-energized, the plunger energy is raised from the bottom of the energized potential well to the extreme edge of the parabolic portion of the de-energized potential energy curve. The solenoid response time is several times its R/L time constant (about 0.1 ms for the exemplary actuator). Once raised to its de-energized potential energy level, the plunger begins to accelerate towards the neutral point 120. The viscous damping coefficient as determined from the resonance curve of FIG. 6 is less than $10^{-4}$ Ns/m and can be essentially neglected. Therefore, the plunger total energy remains constant as the potential energy stored in the springs is converted to the plunger kinetic energy over the null-pulse (power off) duration. When the coil is re-energized, the plunger energy is adjusted downward by the difference between the two potential curves at the position where m is the plunger effective mass, k is the force constant of the suspension springs, and $\tau_{np}$ is the null-pulse $$x = (-110 \, \mu m) \cos\left(\sqrt{\frac{k}{m}} \, \tau_{np}\right),$$

width. In FIG. 8, three separate trajectories are plotted for $\tau_{np}$ less than, equal to, and greater than $$\frac{\pi}{2} \sqrt{\frac{m}{K}}.$$

It is seen that the trajectory for the null-pulse width ending precisely at the neutral position has the fastest transient time and also the largest terminal velocity when arriving at the right travel limit. Any other value results in the plunger arriving later (or not at all) and slower. The second requirement of the successfully switching action is the capture of the plunger by the opposing potential well. This is accomplished by the collisional damping of the plunger kinetic energy. As FIG. 8 indicates, a collisional damping equivalent to 25% of the kinetic energy or, correspondingly, a logarithmic decrement coefficient of 0.14, is sufficient to capture the plunger even at its maximum attainable terminal speed. It is estimated that the logarithmic decrement coefficient for the exemplary actuator are in the 0.2 range. This is the value used to illustrate the cascading relaxation of the fastest transient plunger in FIG. 8 down to the bottom of the right potential well.

A close examination of FIG. 8 shows that the actuator is quite insensitive to the null-pulse width. The minimum required value is approximately 0.4 ms, and the maximum is the de-energized transit time, $$\pi \sqrt{\frac{m}{k}},$$

plus the minimum value, or about 2 ms. This, of course, is only true if there is a sufficiently long hold time following the switch transient in order for the plunger kinetic energy to dissipate fully.

Figure 9:
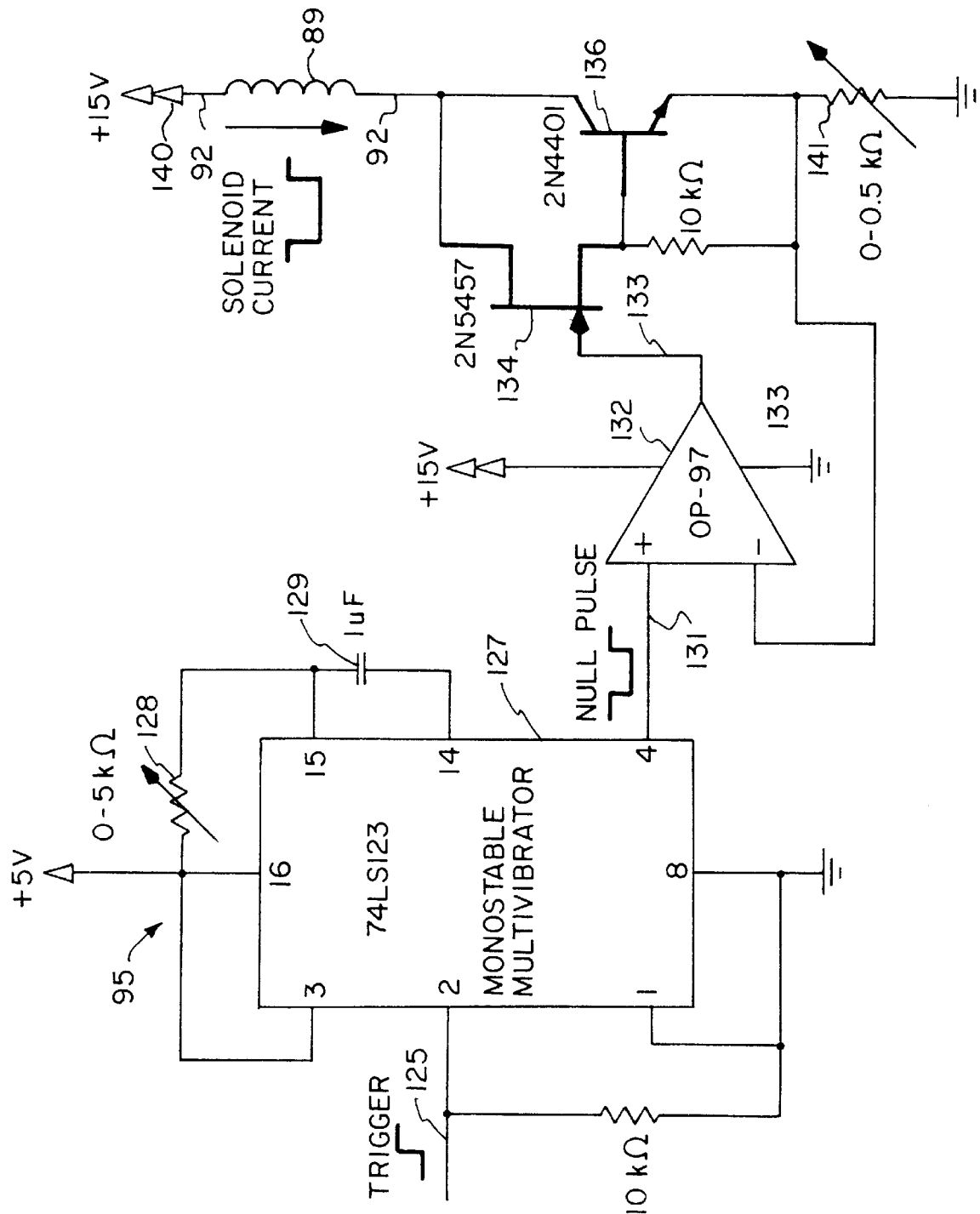
FIG. 9 is a schematic circuit diagram of a switching drive circuit for the microactuator of the invention.

A suitable drive circuit 95 for the actuator is shown in the schematic circuit diagram of FIG. 9. When the actuator is to be switched from one latched position to the other, a trigger signal is provided on an input line 125 from a source (not shown) such as an operator controlled switch, a timer, etc. The trigger signal in the line 125 is received at the input of a monostable multivibrator 127 to which a resistor 128 and a capacitor 129 are connected to set the output pulse width of the multivibrator. The output of the multivibrator 127 is provided on a line 131 to an operational amplifier 132 which provides its output on a line 133 to the gate of an FET 134. The FET is connected to the base of a bipolar transistor 136 to provide drive current to it. The transistors 134 and 136 are connected to the coil 89, which is connected to a voltage source 140. When the transistor 136 is turned on, current flows through the coil 89 and the transistor 136 through an adjustable resistor 141 back to the source 140. The transistor 136 is normally on and is turned off during the duration of the null pulse provided from the multivibrator 127. The length of the null pulse is selected to correspond to the time required for the springs to return the plunger to near its neutral position so that when current is reapplied to the coil 89, the plunger will be driven to its other limit position, as discussed above. The width of the output pulse from the monostable 127 can be adjusted by adjusting the resistance of the resistor 128. The desired pulse width can be determined experimentally, if desired, by adjusting the resistance of the resistor 128 and repeating switching cycles to arrive at the shortest null pulse width at which effective switching still takes place.

As discussed above, the micromechanical actuator of the invention is well suited for incorporation into various types of micro-switches, such as for the switching of electricity, optical fibers or fluids. Such switches formed in accordance with the invention are capable of exceptionally precise, high speed switching.

Figure 10:
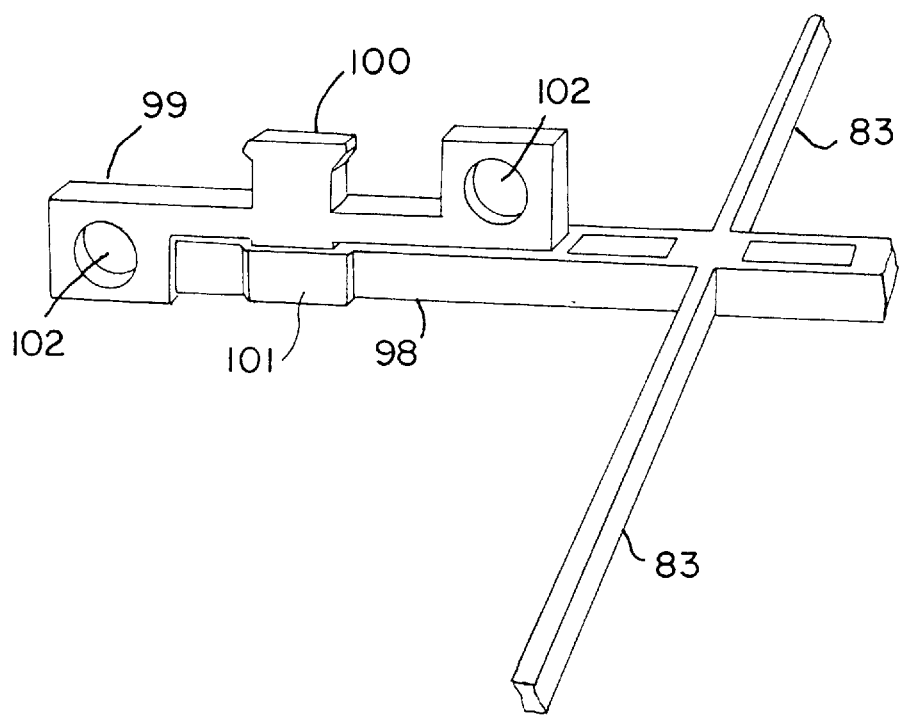
FIG. 10 is an expanded perspective view of the microstructure actuator of FIG. 5, illustrating the mounting of a fiber optic harness on the plunger of the actuator.

To illustrate one example of such a switching structure, FIG. 10 illustrates a fiber optic harness 99 secured to the pushrod 98 of the plunger. The harness 99 may be formed with extensions 100 that can be inserted into and tightly engaged with receptacles 101 (see FIG. 3) formed in the plunger pushrods 98. The harnesses 99 have openings 102 into which an optical fiber (not shown in FIG. 10) can be inserted and secured (as by the use of permanent adhesives).

Figure 11:
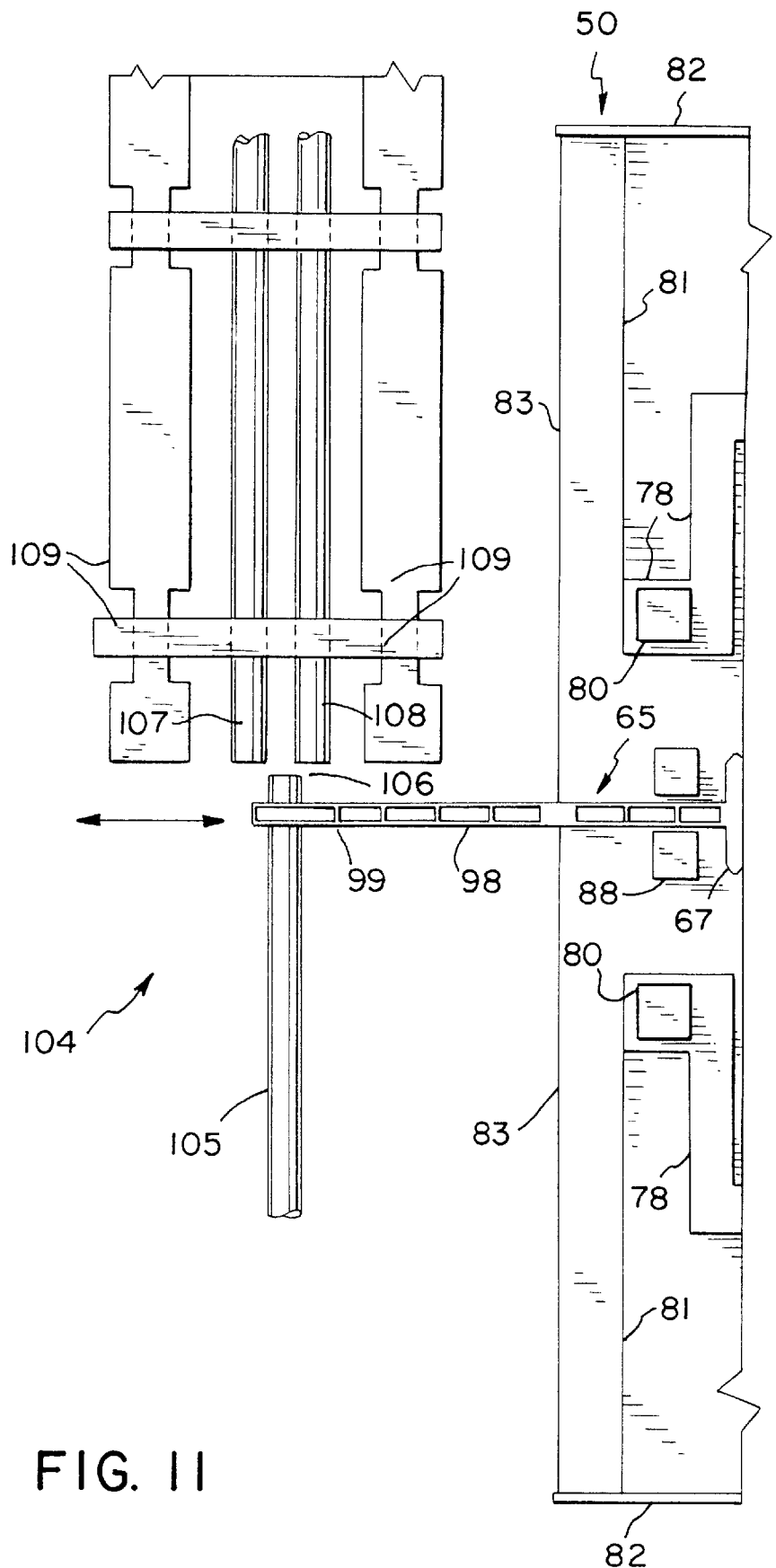
FIG. 11 is a plan view showing a portion of the microstructure actuator of the invention arranged as a fiber optic switch.

FIG. 11 illustrates an optical switch 104 incorporating the actuator 50 of the invention. The switch 104 also includes a moveable optic fiber 105 inserted through the openings 102 for the harness 99 and secured to it, with a face end 106 of the moveable fiber 105 facing and closely spaced from the end faces of stationary optical fibers 107 and 108. The fibers 107 and 108 are fixed in place by metal structures 109 formed on the substrate and over the optical fibers 107 and 108. The moveable fiber 105 is shown in FIG. 11 in the neutral position of the actuator 50. When the actuator 50 is switched as discussed above, the face 106 of the fiber 105 is moved to align with the end face of one or the other of the stationary fibers 107 and 108, resulting in the transfer between the fiber 105 and one or the other of the fibers 107 or 108 of the light beam carried by the fiber, (or vice versa). The actuator 50 can be operated as discussed above to rapidly (and precisely) change the position of the optical switch 104.

Figure 12:
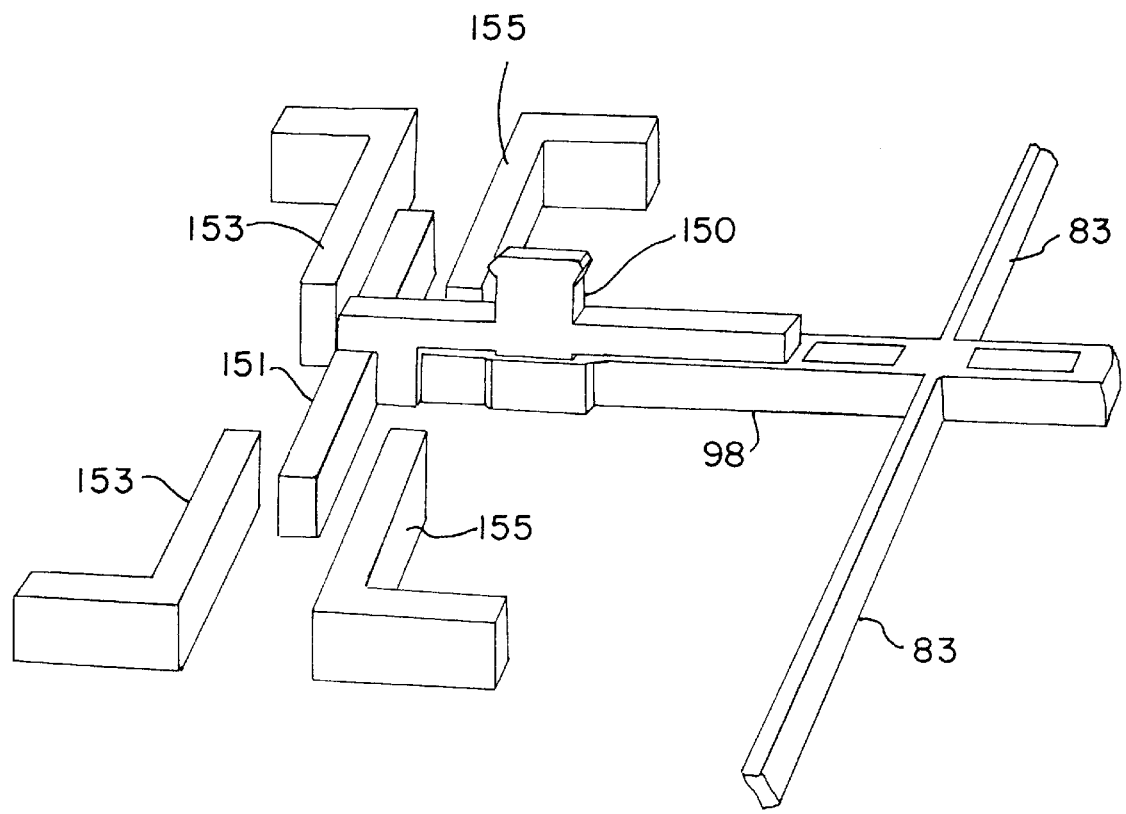
FIG. 12 is an expanded perspective view of the microstructure actuator similar to that of FIG. 10, but with an electrical switch contractor carried by the plunger of the actuator.

As an exemplary embodiment of the actuator of the invention incorporated in an electrical switch, FIG. 12 shows an electrical contact attachment 150 that can be mounted to the plunger pushrod 98 in the same manner as the fiber optic harness 99 of FIG. 10. The attachment 150 includes a laterally extending contact bar 151 which moves longitudinally with the plunger. A first pair of electrical contacts 153 are fixed to the substrate and are engaged by the contact bar 151 to electrically connect the contacts 153 when the plunger moves to its leftmost limit of movement. When the plunger is driven in the opposite direction, the contact bar 151 is engaged against another pair of contacts 155 to complete an electrical connection between these fixed contacts. The pairs of fixed contacts 153 and 155 can be connected by wires (not shown) or conductors in the substrate to other electrical circuit elements (not shown), as desired.

Of course, sets of switches may also be formed at the other pushrod 98 of the actuator, and other types of suitable micro-electrical switch structures, may be connected to the actuator to be driven by it. Where the electrical switch is formed as in FIG. 12, the contacts 153 and 155 may also serve as the stop structures for the plunger. The contacts 153 and 155, with the contract bar 51, form two switches, one of which is closed at one limit of travel of the plunger and the other of which is closed at the other limit of travel.

It is understood that the invention is not confined to the embodiments set forth herein as illustrative of the invention, but embraces all such forms thereof as come within the scope of the following claims.

What is claimed is:

1. A bidirectional micromechanical linear actuator comprising:

(a) a nonmagnetic substrate having a surface;

(b) a plunger having two magnetic heads spaced from each other and joined to move together, at least the heads of the plunger formed of a magnetic material;

(c) a magnetic core supported on the substrate surface, the magnetic core having end faces spaced apart to define a gap in the core;

(d) means for supporting the plunger for linear movement in two directions such that the heads of the plunger can each move toward and away from the gap in the core and biasing the plunger to a neutral position in which the two heads of the plunger are on opposite sides of the gap in the core and urging the plunger toward the neutral position when displaced therefrom;

(e) a coil of electrical conductor coupled to the magnetic core to provide magnetic flux therethrough when the coil is supplied with electrical current and across the gap such that each head of the plunger is magnetically drawn toward the gap by reluctance action when the coil is supplied with current; and (f) stop structures positioned to engage a portion of the plunger at a selected limit of travel of the plunger in each direction of linear movement of the plunger, such that the plunger is held at one or the other of its limits of travel as long as the coil is provided with current and is returned towards its neutral position when the supply of current to the coil ceases.

2. The actuator of claim 1 wherein the means for supporting the plunger comprises a spring mounted to the substrate to suspend the plunger for linear movement above the substrate surface.

3. The actuator of claim 2 wherein the spring is integrally formed with the plunger and includes mounting sections mounted to the substrate, straight leaf sections extending outwardly from the mounting sections, an outward end section to which the leaf sections are joined, and straight leaf sections extending inwardly from the end sections to join to a plunger body on which the plunger heads are formed, the mounting sections, straight leaf sections, end sections, plunger body, and plunger heads formed integrally of ferromagnetic material.

4. The actuator of claim 1 further including an electrical drive circuit means connected to the coil for normally supplying drive current to the coil and responding to a trigger signal to turn off the current to the coil for a selected period of time to allow the plunger to return toward the neutral position.

5. The actuator of claim 1 wherein the core is formed in two separate sections on the substrate on each side of the gap in the core, the top surface of each core section being substantially planar and wherein the core has an opening in the top surface defining a receptacle in each core section, wherein the coil is wound on a mandrel that has a peg extending from an end section on each side of the coil, the pegs adapted to fit into the receptacle openings in the core, the mandrel and coil mounted to the core by insertion of the pegs on the mandrel into the receptacle openings in the core sections to complete a magnetic flux circuit through the mandrel, the core sections, and the gap between the core sections.

6. The actuator of claim 1 including an electrical switch coupled to the plunger to be opened and closed by the plunger at the limits of travel of the plunger.

7. The actuator of claim 1 including two electrical switches coupled to the plunger to be opened and closed by the plunger, one of the switches being closed at one of the limits of travel, and the other of the switches being closed at the other limit of travel.

8. The actuator of claim 1 wherein the plunger comprises an elongated plunger body, the two heads formed at spaced positions on the plunger body with a section of the plunger body between the two heads extending into the gap in the core.

9. The actuator of claim 8 wherein the two heads each have surfaces that are oblique to the linear direction of travel of the plunger, and wherein the end faces of the core have surfaces oblique to the direction of travel of the plunger that face and align with the oblique surfaces on the heads to form flux paths across the facing surfaces on the core and the heads.

10. The actuator of claim 9 wherein the stop structures are positioned to limit the travel of the plunger in each direction such that at each limit of travel the oblique surfaces on one head and the facing oblique surfaces on the end faces of the fixed core are closely adjacent but not in contact.

11. The actuator of claim 1 including an optical switch coupled to the plunger to shift the direction of transmission of light through the switch when the plunger is moved from one of its limits of travel to the other.

12. The actuator of claim 11 wherein the optical switch includes an optical fiber connected to the plunger to be moved by it and fixed optical fibers, the moving and fixed optical fibers having end faces such that the end face of the moving fiber is aligned with the end face of one or the other fixed fiber at each of the limits of travel.

13. The actuator of claim 1 wherein the heads have back surfaces facing away from the gap in the core, wherein the stop structures are formed as posts extending up from the surface of the substrate in position to engage the back surfaces of one of the heads at one limit of travel and to engage the back surfaces of the other head at the other limit of travel.

14. The actuator of claim 1 further comprising an electrical power source connected to the coil to provide switched current to the coil to drive the plunger between the limits of travel of the plunger.

15. A bidirectional micromechanical linear actuator comprising:

(a) a nonmagnetic substrate having a surface;

(b) a plunger having two magnetic heads spaced from each other and joined to move together, at least the heads of the plunger formed of a magnetic material;

(c) a magnetic core supported on the substrate surface, the magnetic core having end faces spaced apart to define a gap in the core;

(d) a spring mounted to the substrate and connected to the plunger to suspend the plunger for linear movement in two directions above the substrate surface such that the heads of the plunger can each move toward and away from the gap in the core, the spring biasing the plunger to a neutral position in which the two heads of the plunger are on opposite sides of the gap in the core and urging the plunger toward the neutral position when displaced therefrom;

(e) a coil of electrical conductor coupled to the magnetic core to provide magnetic flux therethrough when the coil is supplied with electrical current and across the gap such that each head of the plunger is magnetically drawn toward the gap by reluctance action when the coil is supplied with current; and (f) stop structures positioned to engage a portion of the plunger at a selected limit of travel of the plunger in each direction of linear movement of the plunger, such that the plunger is held at one or the other of its limits of travel as long as the coil is provided with current and is returned towards its neutral position when the supply of current to the coil ceases.

16. The actuator of claim 15 wherein the spring is integrally formed with the plunger and includes mounting sections mounted to the substrate, straight leaf sections extending outwardly from the mounting sections, an outward end section to which the leaf sections are joined, and straight leaf sections extending inwardly from the end sections to join to a plunger body on which the plunger heads are formed, the mounting sections, straight leaf sections, end sections, plunger body, and plunger heads formed integrally of ferromagnetic material.

17. The actuator of claim 15 wherein the core is formed in two separate sections on the substrate on each side of the gap in the core, the top surface of each core section being substantially planar and wherein the core has an opening in the top surface defining a receptacle in each core section, wherein the coil is wound on a mandrel that has a peg extending from an end section on each side of the coil, the pegs adapted to fit into the receptacle openings in the core, the mandrel and coil mounted to the core by insertion of the pegs on the mandrel into the receptacle openings in the core sections to complete a magnetic flux circuit through the mandrel, the core sections, and the gap between the core sections.

18. The actuator of claim 15 wherein the plunger comprises an elongated plunger body, the two heads formed at spaced positions on the plunger body with a section of the plunger body between the two heads extending into the gap in the core.

19. The actuator of claim 18 wherein the two heads each have surfaces that are oblique to the linear direction of travel of the plunger, and wherein the end faces of the core have surfaces oblique to the direction of travel of the plunger that face and align with the oblique surfaces on the heads to form flux paths across the facing surfaces on the core and the heads.

20. The actuator of claim 19 wherein the stop structures are positioned to limit the travel of the plunger in each direction such that at each limit of travel the oblique surfaces on one head and the facing oblique surfaces on the end faces of the fixed core are closely adjacent but not in contact.

21. A method of driving a plunger of a micromechanical linear actuator with a single coil comprising the steps of:

(a) providing an actuator having a plunger with two magnetic heads spaced from each other and joined together, at least the heads of the plunger formed of a magnetic material, a magnetic core having end faces spaced apart to define a gap in the core, the plunger supported for linear movement in two directions such that the heads of the plunger can each move toward and away from the gap in the core, a spring biasing the plunger to a neutral position in which the two heads of the plunger are on opposite sides of the gap in the core, and stop structures positioned to engage a portion of the plunger at a selected limit of travel of the plunger in each direction of linear movement of the plunger, and a coil of electrical conductor coupled to the magnetic core;

(b) applying electrical current to the coil to attract by reluctance action one of the heads toward the gap to drive the plunger to a first of its limits of travel where it is engaged and stopped by the stop structures and dwells at the limit of travel for a selected period of time;

(c) discontinuing the supply of current to the coil and allowing the plunger to be returned by the spring toward the gap in the core;

(d) when the plunger is at or near the neutral position of the plunger, reapplying current to the coil to apply force to the other head of the plunger by reluctance action to drive the plunger to the second limit of travel of the plunger where the plunger is engaged and stopped by stop structures.

22. The method of claim 21 including the further step of cutting off the current to the coil after the plunger has remained at the second limit of travel for a selected period of time, and allowing the plunger to return back under spring action toward the gap, and then reapplying current to the coil when the plunger is at or near the neutral position to apply force to the first head of the plunger by reluctance action to drive the plunger to the first limit of travel where it is stopped by the stop structures.

23. The method of claim 22 wherein pulses of current are applied to the coil periodically to drive the plunger back and forth periodically between its limits of travel.

24. The method of claim 21 wherein current is reapplied to the coil when the plunger is substantially at the neutral position.

25. The method of claim 21 wherein current is reapplied to the coil when the plunger has passed under spring action beyond its neutral position.

* * * * *

UNITED STATES PATENT AND TRADEMARK OFFICE
CERTIFICATE OF CORRECTION

PATENT NO. : 5,808,384
DATED : September 15, 1998
INVENTOR(S) : Ned Tabat, et al.

It is certified that error appears in the above-identified patent and that said Letters Patent is hereby corrected as shown below:

In Column 1, at line 3 after the title and before "FIELD OF THE INVENTION":

This invention was made with United States Government support awarded by the following agencies: DOE Prime Contract No.: DE-AC04-94AL85000, Case No.: S-89,799. The United States Government has a nonexclusive, nontransferable, irrevocable, paid-up license in this invention pursuant to a purchase order, AL-5799, between the University of Wisconsin and Sandia Corporation, a contractor for the United States Department of Energy. The United States has certain rights in this invention.

Signed and Sealed this

Ninth Day of March, 1999

Attest:

Q. TODD DICKINSON

*Attesting Officer*    *Acting Commissioner of Patents and Trademarks*